United States Patent
Jung

(10) Patent No.: US 7,711,390 B2
(45) Date of Patent: May 4, 2010

(54) APPARATUS AND METHOD FOR CONTROLLING DISPLAY OF A MESSAGE AT A MOBILE TERMINAL

(75) Inventor: Sang-Bum Jung, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 847 days.

(21) Appl. No.: 11/458,880

(22) Filed: Jul. 20, 2006

(65) Prior Publication Data

US 2007/0021154 A1    Jan. 25, 2007

(30) Foreign Application Priority Data

Jul. 20, 2005    (KR)    ........................ 10-2005-0065963

(51) Int. Cl.
H04B 1/38    (2006.01)
(52) U.S. Cl. ........................................ 455/556; 455/466
(58) Field of Classification Search ................. 455/566, 455/466
See application file for complete search history.

(56) References Cited

U.S. PATENT DOCUMENTS

| 2003/0182428 A1* | 9/2003 | Li et al. ........................ 709/227 |
| 2003/0200266 A1* | 10/2003 | Henry .......................... 709/206 |
| 2004/0075691 A1* | 4/2004 | Moon ........................... 345/805 |
| 2005/0135681 A1* | 6/2005 | Schirmer ..................... 382/229 |
| 2006/0079147 A1* | 4/2006 | Wong et al. .................. 446/142 |
| 2006/0148496 A1* | 7/2006 | Zhu et al. .................... 455/466 |

FOREIGN PATENT DOCUMENTS

EP    0920227    10/1998
KR    10-2002-0052113 A    7/2002

* cited by examiner

Primary Examiner—David Q Nguyen
(74) Attorney, Agent, or Firm—Lee, Hong, Degerman, Kang & Waimey

(57) ABSTRACT

An apparatus and method for displaying a message on a display of a mobile terminal includes storing an unsent message in memory responsive to a system event, such as receiving an incoming call at the mobile terminal, and automatically displaying on the display at least one of an indicator or the stored unsent message after a predetermined period of time has elapsed.

6 Claims, 3 Drawing Sheets

APPARATUS AND METHOD FOR CONTROLLING DISPLAY OF A MESSAGE AT A MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2005-0065963, filed on Jul. 20, 2005, the contents of which are hereby incorporated by reference herein in their entirety

BACKGROUND OF THE INVENTION

1. Field of the Invention

The present invention relates to a mobile terminal, and more particularly to an apparatus and method for controlling display of a message at a mobile terminal.

2. Discussion of the Related Art

In general, mobile terminals, such as mobile phones and personal digital assistants (PDAs), provide limited assistance in recovering messages which have not yet been sent to their intended recipient. For example, consider the scenario in which the user is inputting a message (e.g., a short message service (SMS) message) when an incoming call is received at the mobile terminal. The incoming call typically has priority over the message input function such that the mobile terminal will either delete the message or will save the unsent message to a particular location, such as a drafts folder in the message application.

In the event the user wants to finish creating the message after completing the call, the user must find the location at which the message application has stored the message and then actively retrieve the message. This takes time and effort, which the user is not always willing or able to expend. In addition, less-experienced users may not be able to find the location of the stored message, or they may not know how to retrieve the saved message. Another disadvantage with existing systems is that the user may forget that the mobile terminal saved the unsent message for later retrieval.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description, and claims hereof, as well as the appended drawings.

In accordance with an embodiment, a method for displaying a message on a display of a mobile terminal includes storing an unsent message in memory responsive to a system event, and automatically displaying on the display at least one of an indicator or the stored unsent message after a predetermined period of time has elapsed.

According to one feature, the system event comprises an incoming call to the mobile terminal.

According to another feature, the displaying includes audibly indicating the displaying of the indicator or the stored unsent message.

According to yet another feature the displaying includes displaying the indicator (e.g., an icon) on the display.

According to one example, the method may further include storing a plurality of unsent messages in the memory responsive to one or more system events, and automatically displaying at least one of the plurality of stored unsent messages on the display after the predetermined period of time has elapsed.

According to another example, the unsent message may include a short message service (SMS) message.

In accordance with another embodiment, a method for displaying a message on a display of a mobile terminal includes storing an unsent message in memory responsive to a system event, searching for unsent messages stored in the memory responsive to user access to an application executing at the mobile terminal, and displaying on the display at least one of an indicator or at least one unsent message found during the searching. The application may be implemented as a messaging application, an electronic phone book, or an application which includes contact information.

In accordance with yet another embodiment, a method for displaying a message on a display of a mobile terminal includes storing an unsent message in memory responsive to a system event, receiving a user request for information relating to a particular entry in a contact list, and responsive to the user request, searching the memory for unsent messages associated with the particular entry, and displaying on the display at least one of an indicator or at least one unsent message found during the searching.

According to one feature, the contact list is an electronic phone book.

In accordance with another embodiment, an apparatus for controlling display of a message at a mobile terminal includes memory for storing an unsent message responsive to a system event, a display, and a controller for automatically displaying on the display at least one of an indicator or the stored unsent message after a predetermined period of time has elapsed. If desired, the apparatus may further include a speaker for audibly indicating the displaying of the indicator or the stored message.

In accordance with still another embodiment, an apparatus for controlling display of a message at a mobile terminal may include memory for storing an unsent message responsive to a system event, a controller for searching for unsent messages stored in the memory responsive to user access to an application executing at the mobile terminal, and a display for displaying at least one of an indicator or at least one unsent message found during the searching.

In accordance with still yet another embodiment, an apparatus for controlling display of a message at a mobile terminal includes a memory for storing an unsent message responsive to a system event, a controller for receiving a user request for information relating to a particular entry in a contact list, such that the controller is further configured to, responsive to the user request, search for unsent messages associated with the particular entry and stored in the memory, and a display for displaying on the display at least one of an indicator or at least one unsent message found during the search for unsent messages.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

Figure 1:
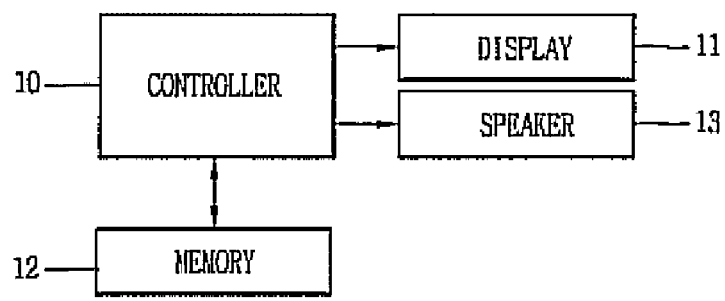
FIG. 1 is a schematic block diagram showing an apparatus for controlling display of a message at a mobile terminal in accordance with an embodiment of the present invention.

FIG. 1 is a schematic block diagram showing an apparatus for controlling display of a message at a mobile terminal in accordance with an embodiment of the present invention. As shown in FIG. 1, the apparatus includes controller 10 for displaying on display 11 an indicator, stored unsent messages, or both. Memory 12 may be used for storing an unsent message responsive to a system event, such as an incoming call received by the mobile terminal. Speaker 13 may be used for audibly indicating the displaying of the indicator or the stored unsent message.

Figure 2:
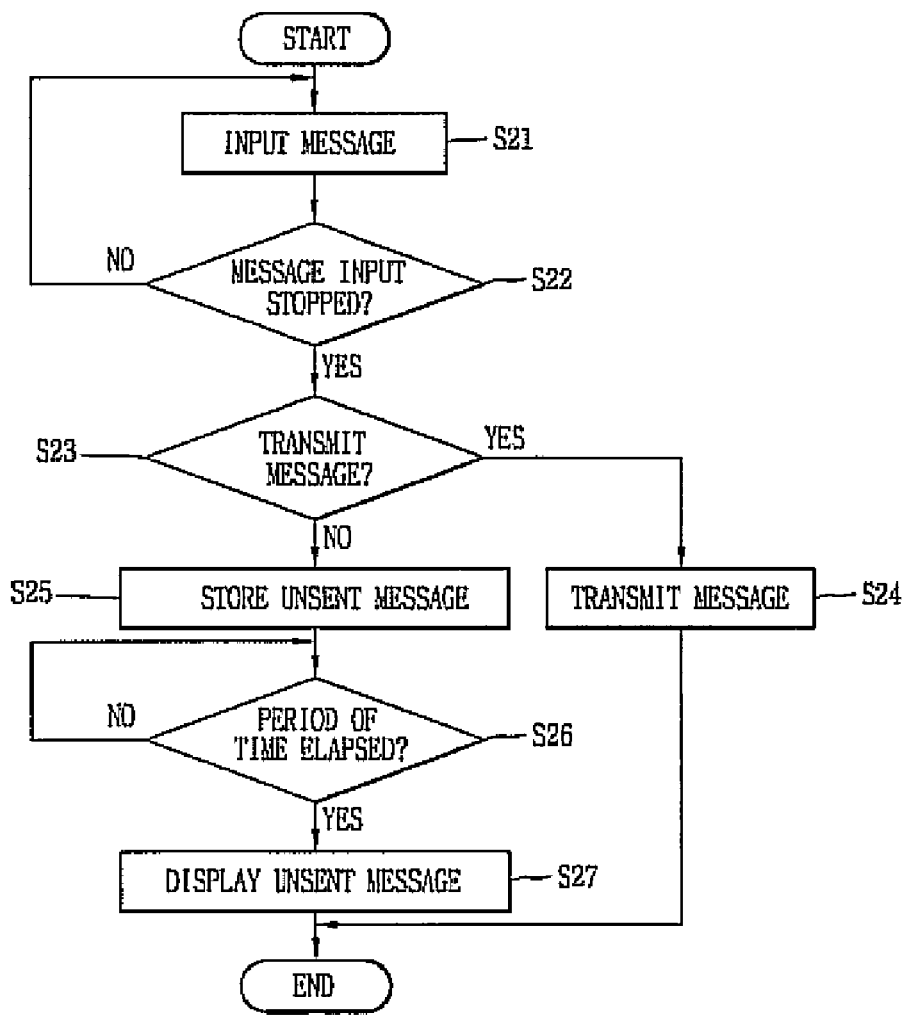
FIG. 2 is a flowchart depicting a method for displaying a message on a display of a mobile terminal in accordance with an embodiment of the present invention.

FIG. 2 is a flowchart depicting a method for displaying a message on a display of a mobile terminal in accordance with an embodiment of the present invention. By way of example only, the various methods depicted in FIGS. 2-4 will be described with regard to the apparatus shown in FIG. 1. However, it is to be understood that the present invention is not so limited and may alternatively be implemented using other devices or systems.

Referring now to FIG. 2, block S21 relates to the message input process. This process typically occurs when a user is creating or otherwise inputting a message into the mobile terminal. The message may be implemented using any type of messaging format compatible with the wireless communication system within which the mobile terminal operates. Suitable types of messaging formats include short message service (SMS), enhanced message service (EMS), multimedia messaging service (MMS), and email, among others.

Decision block S22 determines if the message input process has stopped, halted, or has otherwise terminated. Reasons for the message input process terminating include the detection of a system event (e.g., receiving an incoming call) or by user-manipulation of a transmit or send key on the mobile terminal, for example, indicating that the message is complete and ready for transmitting.

If the message input process is not terminated, control flows back to block S21 so that the user may continue to input the message. On the other hand, if the message input process has terminated (e.g., detection of a system event), control flows to decision block S23. According to this operation, if the message is complete or is otherwise ready for transmitting, control flows to block S24 so that the completed message may be transmitted to an identified recipient. This operation may be accomplished by controller 10 transmitting the completed message to another mobile terminal, for example, which subsequently receives the message in known fashion.

Referring back to block S23, in the event that the message is not complete or is otherwise not ready for transmitting, control flows to block S25. At this point, controller 10 stores the unsent message in a suitable memory location (e.g., memory 12) for later retrieval.

If desired, a timing function may be employed such that controller 10 determines if a predetermined time period has elapsed (e.g., 1-10 minutes, or more) since the unsent message has been stored or since the occurrence of the system event (block S26). The length of this time period may be user-defined, system-defined, or user-selectable. After the time period has elapsed, controller 10 may retrieve and subsequently display the unsent message on display 11, for example (block S27). These operations provide one example of automatically displaying an unsent message after the predetermined period has elapsed. In accordance with an embodiment, an audio alarm may also be produced to audibly indicate the displaying of the unsent message.

It is to be understood that automatically displaying of an unsent message is not a requirement. Alternatively or additionally, an indicator (e.g., a solid or flashing message icon, a light, the number of stored unsent messages, or other indicator) may be presented on the display or other location of the mobile terminal. The indicator provides notice to the user of the existence of an unsent message which has been saved by the mobile terminal and is available to the user.

The foregoing provides a procedure for presenting to the user of the mobile terminal an unsent message which was being created by the user prior to the system event. Automatically displaying of the unsent message after the predetermined period of time serves as a reminder to the user that an unsent message exists. Another benefit is that the unsent message may be presented to the user without any affirmative action by the user. That is, the unsent message may be redisplayed to the user without the user having to search for the message or having to recall that the message was unfinished and has not yet been sent.

Figure 3:
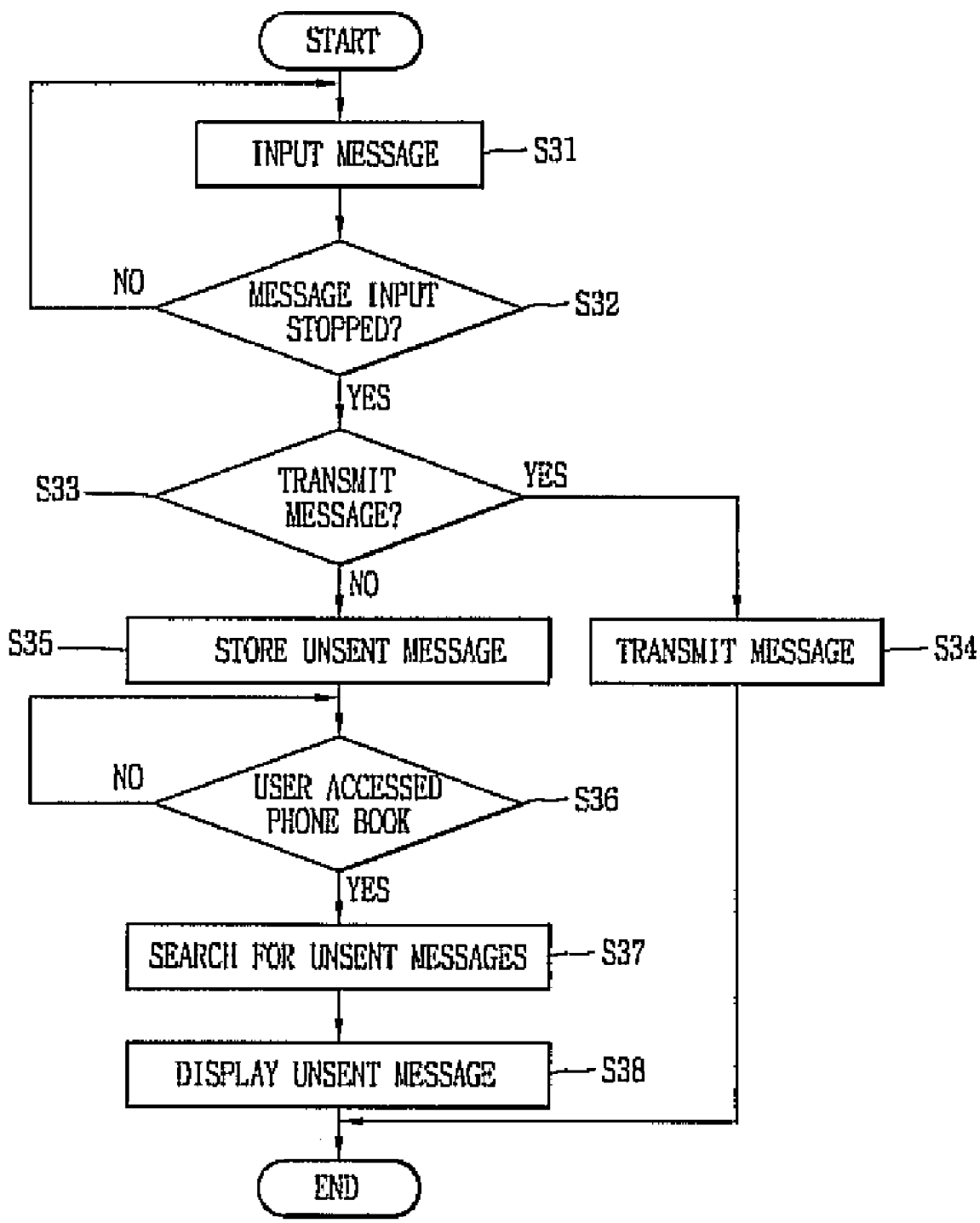
FIG. 3 is a flowchart depicting a method for displaying a message on a display of a mobile terminal in accordance with another embodiment of the present invention.

FIG. 3 is a flowchart depicting a method for displaying a message on a display of a mobile terminal in accordance with another embodiment of the present invention. The first few operations of FIG. 3 may be implemented in a manner similar to that described in FIG. 2. For instance, block S31 includes the message input process, and decision block S32 determines if this message input process has terminated. If the message input process is not terminated, control flows back to block S31 so that the user may continue to input the message. On the other hand, if the message input process has terminated (e.g., detection of a system event), control flows to decision block S33. According to block S33, if the message is complete or is otherwise ready for transmitting, control flows to block S34 so that the completed message can be transmitted to an identified recipient.

Referring back to block S33, in the event that the message is incomplete or is otherwise not ready for transmitting, control flows to block S35. At this point, controller 10, for example, stores the unsent message in memory 12 or other suitable storage location for later retrieval.

Control now flows to decision block S36. It is to be understood that a period of time typically occurs between the storing operation of block S35 and decision block S36. This period of time may be a matter of seconds, several minutes or hours, or even days or weeks. The point is that a certain time period will elapse between when the unsent message was stored and when the phone book function, for example, of the mobile terminal is accessed by the user.

According to decision block S36, if the user accesses an application (e.g., electronic phone book, contact list, or other application containing user contact or messaging information) executing at the mobile terminal, control flows to block S37 resulting in a search for unsent messages which have been stored at the mobile terminal. An unsent message is a message which has been stored according to the storing operation of block S35.

As an example, operation of block S36 may occur by the user selecting the phone book application of the mobile terminal in order to search for or otherwise locate information (e.g., telephone number, email address, physical address, and the like) associated with a particular person or organization.

In block S37, if no unsent messages have been found, further operation may be terminated. However, if one or more unsent messages are located, control flows to block S38 so that the located messages can be displayed on display unit 11, for example. If desired, an audio alarm may also be produced to audibly indicate the displaying of the message. Similar to other embodiments, displaying of the unsent message is not a requirement and providing an indicator may alternatively or additionally be implemented.

Figure 4:
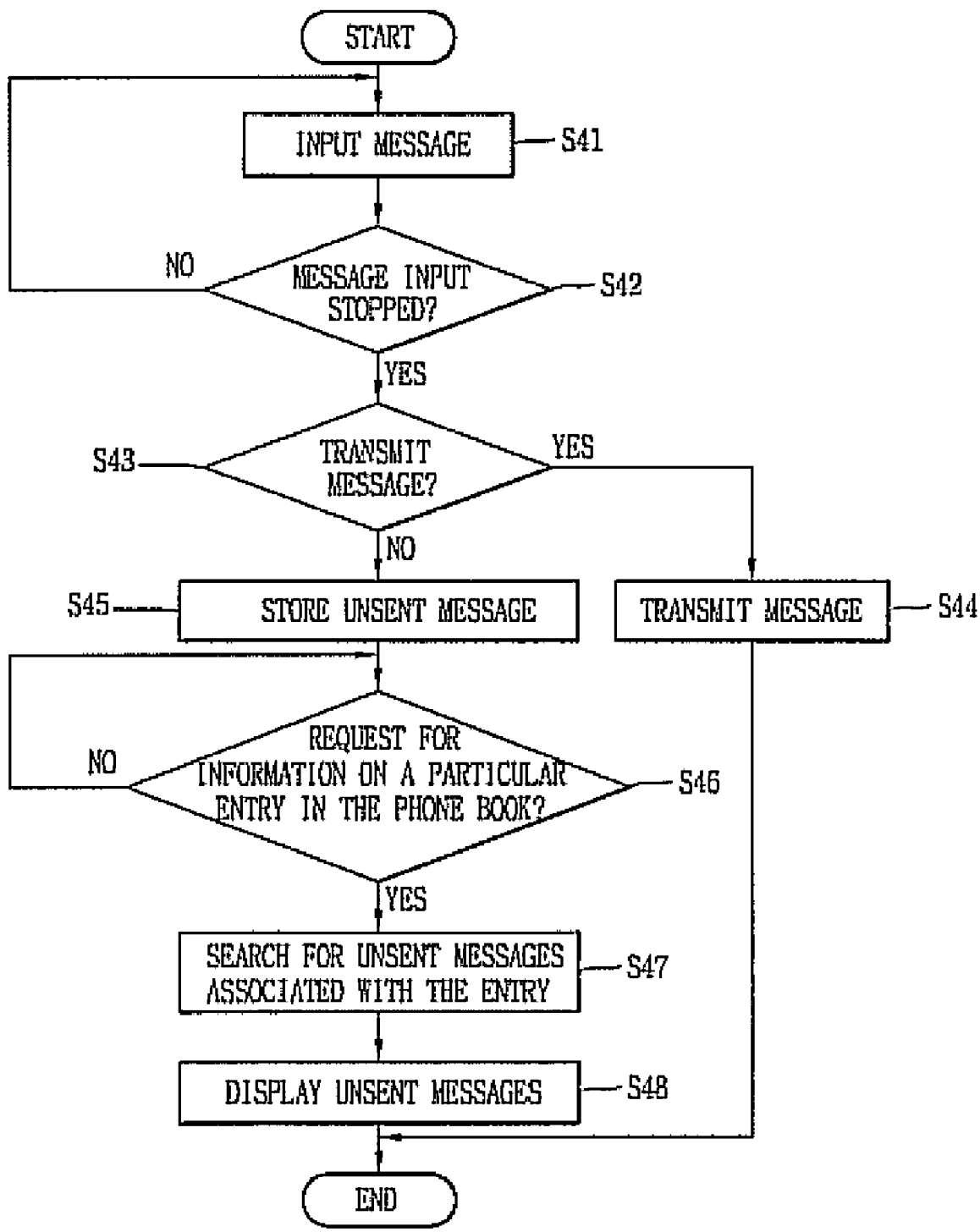
FIG. 4 is a flowchart depicting a method for displaying a message on a display of a mobile terminal in accordance with yet another embodiment of the present invention.

FIG. 4 is a flowchart depicting a method for displaying a message on a display of a mobile terminal in accordance with another embodiment of the present invention. The first few operations of FIG. 4 may be implemented in a manner similar to that described in FIG. 3. For example, the operations of blocks S41-S45 (FIG. 4) may be performed according to that described with regard to blocks S31-S35 of FIG. 3. Note that the storing operation of block S45 may additionally associate the stored message with an intended recipient of the message.

According to decision block S46, if the user requests information (e.g., name, entity, recipient, email address, and the like) relating to a particular entry in a contact list, then control flows to block S47. Examples of a contact list include an electronic phone book, messaging contact list, or other application containing user contact or messaging information.

Responsive to the user request, the operation of block S47 includes a search for unsent messages which have been stored at the mobile terminal and which are associated with the particular entry requested by the user. In a non-limiting example, the user may first request the phone book entry for John Smith (block S46). As a result, the operations of block S47 will responsively perform a search for any saved unsent messages which are associated with John Smith. Saved unsent messages which are associated with other entries need not be searched or displayed in accordance with the operations of block S47.

In block S47, if no unsent messages are found, further operation may be terminated. However, if one or more unsent messages are located, control flows to block S48 so that the located messages can be displayed on display 11, for example. If desired, an audio alarm may also be produced to audibly indicate the displaying of the message. Similar to other embodiments, displaying of the actual message is not a requirement and providing an indicator may alternatively or additionally be implemented.

A benefit provided by the embodiment of FIG. 4 is that the user of the mobile terminal can be automatically notified of an unsent message associated with a particular person whenever the user requests, for example, a particular entry of the phone book. This is useful since the user may have forgotten that they had created, but had not yet sent, a message to the person that they are now accessing in the phone book.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for displaying a message on a display of a mobile terminal, said method comprising:
   storing, in the mobile terminal, an unsent message in memory responsive to a system event;
   receiving, in the mobile terminal, a user request for information relating to a particular entry in a contact list;
   responsive to said user request, searching said memory in the mobile terminal for unsent messages associated with said particular entry; and
   displaying on said display in the mobile terminal at least one of an indicator or at least one unsent message found during said searching.

2. The method according to claim 1, wherein said contact list is an electronic phone book.

3. The method according to claim 1, wherein said displaying comprises displaying said indicator.

4. The method according to claim 1, further comprising:
   storing a plurality of unsent messages in said memory responsive to one or more system events; and
   displaying on said display at least one of said plurality of said stored unsent messages found during said searching.

5. An apparatus for controlling display of a message at a mobile terminal, said apparatus comprising:
   a memory for storing an unsent message responsive to a system event;
   a controller for receiving a user request for information relating to a particular entry in a contact list, wherein said controller is further configured to, responsive to said user request, search for unsent messages associated with said particular entry and stored in said memory; and
   a display for displaying on said display at least one of an indicator or at least one unsent message found during said search for unsent messages.

6. The apparatus according to claim 5, wherein said contact list is an electronic phone book.

* * * * *